K. A. SIMMON & P. L. MARDIS.
SYSTEM OF DISTRIBUTION.
APPLICATION FILED FEB. 3, 1916.
1,270,885.
Patented July 2, 1918.
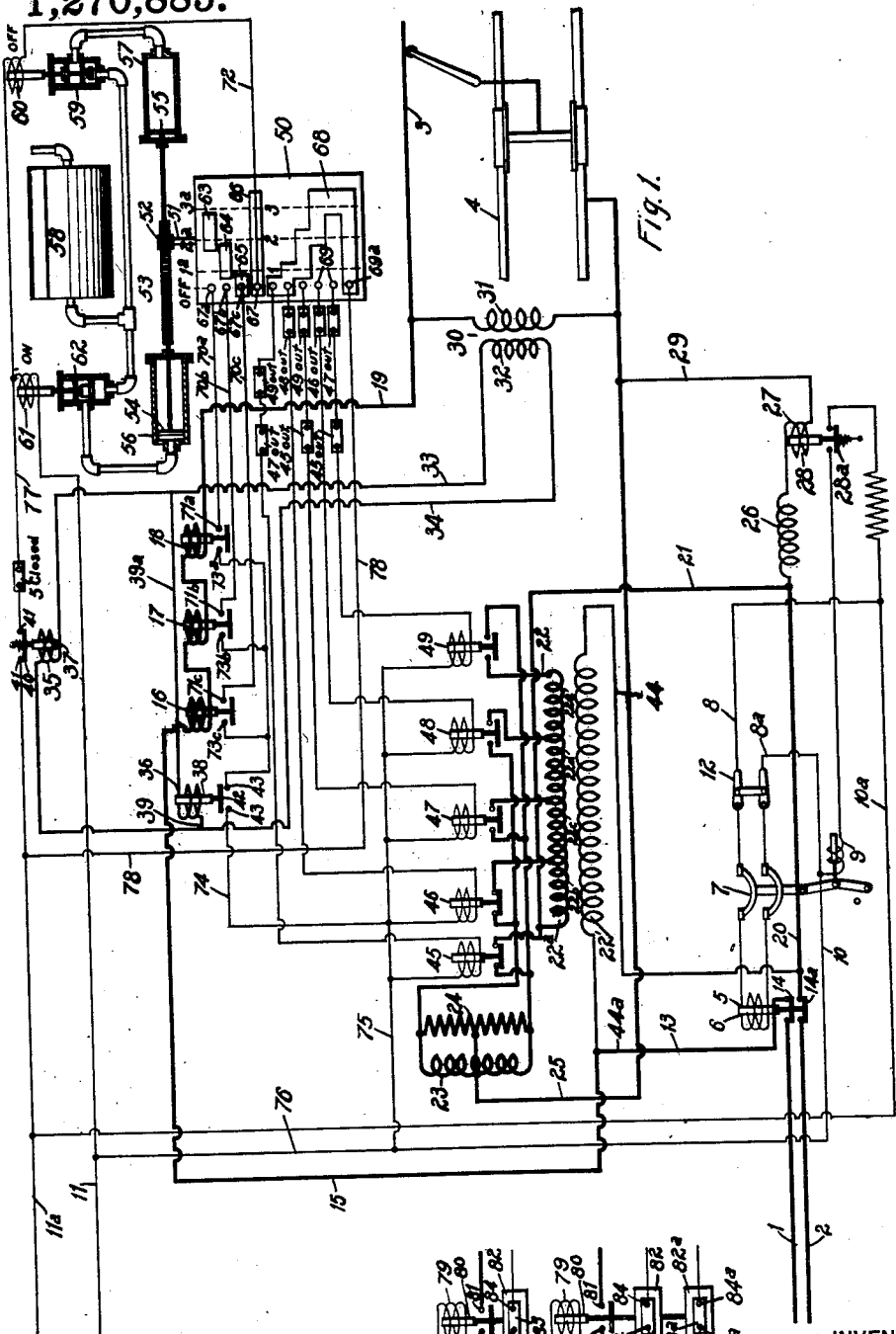
WITNESSES:
A. J. Fitzgerald
Geo. W. Hansen
INVENTOR
Karl A. Simmon,
& Paul L. Mardis.
BY
Wesley G. Carr
ATTORNEY

UNITED STATES PATENT OFFICE.

KARL A. SIMMON, OF EDGEWOOD PARK, AND PAUL L. MARDIS, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF DISTRIBUTION.

1,270,885.      Specification of Letters Patent.      Patented July 2, 1918.

Application filed February 3, 1916. Serial No. 75,961.

*To all whom it may concern:*

Be it known that we, KARL A. SIMMON, a citizen of the United States, and a resident of Edgewood Park, in the county of Allegheny and State of Pennsylvania, and PAUL L. MARDIS, a citizen of the United States, and a resident of Wilkinsburg, in the county of Allegheny and State of Pennsylvania, have invented a new and useful Improvement in Systems of Distribution, of which the following is a specification.

Our invention relates to electrical systems of distribution and especially to alternating-current systems that are adapted to supply electrical power at a substantially constant voltage to varying loads such as obtain in railway systems and the like.

More particularly, our invention relates to alternating-current systems of the above-indicated character which embody means for automatically regulating the voltage that may be impressed upon the power system. In our present invention, the regulating means is independent of the generating apparatus, the voltage corrections being effected by automatically varying the active length of a voltage-generating winding in accordance with variations of the voltage directly impressed upon the power system and the loads obtaining therein.

An object of our invention, therefore, is to provide means, in an electrical distributing system, that comprises a supply circuit and a load circuit, whereby the voltage that is impressed upon the load circuit may be automatically regulated in accordance with the amount of power furnished thereto from the supply circuit when the applied voltage tends to vary beyond a definite range.

For a better understanding of the nature, the scope and the characteristic features of our invention, reference may be had to the following description and the accompanying drawing in which Figure 1 is a diagrammatic view of a system of electrical distribution embodying our invention, and Figs. 2 and 3 are diagrammatic views showing several types of interlocking switches employed in the control circuits of Fig. 1.

Referring to Fig. 1, a supply circuit comprising mains 1 and 2 furnishes power to a load or railway circuit comprising a trolley conductor 3 and a track circuit 4. For the purpose of illustration, the track circuit 4 is shown directly connected to a conductor, but, in commercial installations, the connections to the track-circuit of a railway system are usually made through ground. A remote control switch 5 is interposed between the mains 1 and 2 and the railway circuit in order to establish paths for the interchange of the power currents between the two circuits. The switch 5 comprises an actuating magnet 6 which is furnished with current flowing through a circuit-breaker 7 from mains 8 and 8ª. The main 8ª is connected adjacent to, but on the line side of, an actuating coil 9 of the circuit breaker 7 and a conductor 10 to a main 11 of a control circuit, the latter being furnished with power from any suitable source (not shown). The main 8 is directly connected, through a conductor 10ª, to the other main 11ª of the control circuit. By closing the circuit breaker 7 and a switch 12, the actuating coil 6 of the switch 5 is energized, thereby establishing a circuit, as follows: The supply conductor 1 is connected through a bridging member 14 to the switch 5 to a conductor 13, a conductor 15, magnetically-operated switches 16, 17 and 18, a conductor 19 and the trolley conductor 3 of the railway system. The supply main 2 is connected through a bridging member 14ª of the switch 5 to a conductor 20, a conductor 21, selected portions of a voltage-generating winding 22, limiting reactance and resistance elements 23 and 24, respectively, a conductor 25, and the track circuit 4. An auxiliary path is connected in shunt to the last mentioned circuit that comprises a limiting reactance element 26, a winding 27 of a switch member 28 and a conductor 29. The choke coil 26 limits the current flow through the shunt path which is furnished to protect the system, as will be hereinafter explained. From the foregoing description, it will be apparent that the switches 16, 17 and 18 are so connected that the load currents supplied to the railway circuit will flow through their windings, thereby actuating these switches in accordance with the loads obtaining in the railway circuit. Moreover, the voltage-generating winding 22 is so adapted that selected portions thereof may be connected in series-circuit relationship with the railway circuit and disconnected therefrom in such a manner that voltage corrections may be made;

that is, additions to, and subtractions from, the supply voltage furnished by the power supply circuit comprising the mains 1 and 2.

A voltage transformer 30 is provided with a primary winding 31 that is connected directly across the conductors 3 and 4 of the railway circuit and with a secondary winding 32 which is connected in a closed circuit, by means of conductors 33 and 34, with windings 35 and 36 of switch members 37 and 38, respectively, said windings being connected, by means of conductors 39 and 39ª, in parallel relationship with each other. The switch 37 is so designed that, when an over-voltage is impressed upon the secondary winding 32 of the transformer 30, for example, a voltage equal to 110 per cent. of the normal voltage of the railway system, the switch 37 will so operate as to disengage a bridging member 40 from contact members 41. The switch member 38 is so designed as to effect engagement between a bridging member 42 and contact members 43 when a voltage below normal, such as 90 per cent. of normal, is impressed upon the railway system. It will be noted, therefore, that the switch 37 is actuated to disconnect its associated circuit when an over-voltage is impressed upon the railway system, and the switch 38 is actuated to close its associated circuit when a voltage below normal is impressed upon the railway system.

The voltage-generating winding 22, which serves in the capacity of a "boosting" transformer winding, constitutes the secondary winding of a transformer 22ª having a primary winding 22', one terminal of the latter winding being connected, by means of a conductor 44, to the main 2 of the supply circuit and the other terminal thereof being connected, by means of a conductor 44ª, to the main 1 of the supply circuit. Different portions of the secondary winding 22 are connected in and out of circuit with the railway system in accordance with the operation of the switch members 45, 46, 47, 48 and 49 that, in turn, are actuated by means of being selectively connected to the control circuit through a control drum 50 shown in development in Fig. 1.

The drum 50 is of the usual type of construction, such as is common in controllers utilized in railway cars and the like, and is provided with a shaft 51 to which a pinion 52 is secured. The drum 50 is actuated by means of a rack 53 which meshes with its pinion 52 and is connected, at its respective ends, to pistons 54 and 55 which operate in cylinders 56 and 57, respectively. Fluid pressure is admitted from a tank or reservoir 58 through an electromagnetically-controlled valve 59 to the cylinder 57 when an actuating coil 60 of the valve is deënergized, as shown in the drawing. Fluid pressure is admitted from the tank 58 to the cylinder 56 when an actuating coil 61 of the magnet valve 62 is energized. For convenience, we will designate the valve 62 and its actuating coil as the "on" magnet-valve and the valve 59 and its actuating coil 60 as the "off" magnet-valve.

The arrangement of parts is such that, if both the "on" and "off" magnet-valves are deënergized, fluid pressure will be admitted through the valve 59 to the cylinder 57 and will so actuate the piston 55 and the rack 53 as to throw the drum 50 to its "off" position, in which position it is shown in Fig. 1. If the "on" magnet-valve 61 is energized, fluid pressure will be admitted to the cylinder 56, but no motion of the drum will result, inasmuch as the pressures are then balanced on the two sides of the piston member 54. In this instance, the drum 50 is retained in a fixed position which it may occupy at any time previous to the energization of the "on" magnet-valve and the deënergization of the "off" magnet-valve. A motion of the drum 50 may be effected, however, by subsequently energizing the coil 60 of the valve 59 since, by this means, the valve 59 will cut off the supply of pressure from the reservoir and will open the exhaust port of the cylinder 55. As long as the windings 60 and 61 are energized, the drum 50 will move in the direction opposite to its "off" position. As mentioned above, the drum 50 may be stopped at any position by deënergizing the coil 60, and it may be returned to its "off" position by merely deënergizing the coils 60 and 61.

The drum 50 is divided into two portions, the upper portion comprising the contact strips 63, 64, 65 and 66 having the relative positions and sizes indicated in the drawing and being electrically interconnected in order that the circuit connections through the "off" magnet-valve winding 60 may be controlled according to the relative positions of the several said contact strips and the separate contact fingers 67 of the controller. The lower portion of the drum member 50 comprises a single conducting strip 68 which is of zig-zag form, as shown, to vary the connections between contact fingers 69 of the controller. By means of the dotted lines 1ª, 2ª and 3ª, we have indicated, in a usual manner, the several positions which the drum 50 may occupy, as actuated by the aforementioned pneumatic control apparatus. Each of the contact fingers 67 is connected to one of the switch members 16, 17 and 18, the contact finger 67ª being connected by a conductor 70ª to a contact member 71ª of the switch 18, the contact finger 67ᵇ being connected by a conductor 70ᵇ to a contact member 71ᵇ of the switch 17 and the contact finger 67ᶜ being connected by a conductor 70ᶜ to a contact member 71ᶜ of the switch 16. The contact finger permanently engaging the conducting strip 66 is connected through a conductor 72 to the winding 60 of the "off" magnet valve 59. When the switch 38 operates to bridge the contact members 43, corresponding contact members 73ᶜ, 73ᵇ and 73ᵃ of the switches 16, 17 and 18, respectively, are connected directly to the control-circuit conductor 11 through conductors 74, 75 and 76. The other side of the control circuit constituting the main 11ᵃ may be connected by means of the switch member 37, a conductor 77, the winding 60 of the "off" magnet valve 59 and the conductor 72 to the other contact terminals of the switch members 16, 17 and 18, depending upon the position occupied by the control drum 50. It will be noted, therefore, that the circuits controlled by the switches 38, 16, 17 and 18 are completed through the upper portion of the drum 50 which effects engagements between the separate contact fingers and the several conducting strips 63, 64 and 65.

The lower portion of the drum 50 controls the energization of the switch members 45, 46, 47, 48 and 49 which, in turn, cut-in or cut-out portions of the voltage-generating or secondary winding 22 by means of which the voltage of the railway system may be regulated. Corresponding terminals of the windings of the said switch members are connected to the conductor 75 which, in turn, is connected, by means of the conductor 76, to the main 11 of the control circuit. The other terminals of the windings of the said switch members are connected, in succession, through the interlock switches indicated, to the contact fingers 69 of the lower portion of the drum controller 50. The other main 11ᵃ of the control circuit is permanently connected to the conducting strip 68 of the lower portion of the controller 50 by means of a conductor 78 and the contact finger 69ᵃ. It will be noted, therefore, that the energization of the switches 45, 46, 47, 48 and 49 is effected by means of engagement between the separate contact-fingers 69 and the conducting strip 68.

By varying the position of the control drum 50, a section 22ᵇ of the secondary winding 22 may be connected into and out of circuit by means of the switch members 45 and 46, a section 22ᶜ may be connected into and out of circuit by means of the switch members 46 and 47, a section 22ᵈ may be connected into and out of circuit by means of switch members 47 and 48, and a section 22ᵉ may be connected into and out of circuit by means of the switch members 48 and 49, as will be hereinafter explained.

The limiting reactance coil 23, in conjunction with the resistor 24, is employed to limit the short-circuit currents that may flow in the separate sections of the secondary winding 22, during the switching operations, such as is well known in the art. It will be noted, therefore, that the conductor 25 over which the load currents flow and which is connected directly to the rail circuit 4 of the railway system is connected to mid-points of said current-limiting devices. The switch members 45, 46, 47, 48 and 49, which are constructed in accordance with Figs. 2 and 3, are of a well-known type for use in manipulating control circuits and carry control-circuit interlock segments.

The structure of switches 46 and 48 is shown in Fig. 2 in which an energizing coil 79 actuates a core member 80 to bridge the contact members 81. An insulating block 82 is secured to the member 80 and is provided with a conducting strip 83 which, when the switch is in its open position, as indicated, bridges contact members 84. When the switch is actuated, the electrical connections between the contact members 84 is broken, inasmuch as the strip 83 is advanced upwardly. To facilitate illustration of the switches associated with the contact fingers of the lower portion of the drum controller 50, the conducting strips of the several switches are correspondingly numbered and, by means of the attached notations, indicate that, when their associated switches 45, 46, 47, 48 and 49 are energized, the corresponding conducting strips break the electrical connection between the coöperating contact members. This method of illustrating interlocking switches is a common one.

The switch illustrated in Fig. 3 corresponds to the switches 45, 47 and 49 which embody the structure shown in Fig. 2 with the exception of an additional insulating strip 82ᵃ upon which is mounted a conducting strip 83ᵃ for effecting engagement with contact members 84ᵃ. Switches of this type are employed when it is desired to break or make, as preferred, the continuity of a plurality of circuits in accordance with the movements of the plunger magnets. For instance, it will be noted that the upper contact finger 69 of the lower portion of the drum 50 is connected to the conducting strips 47 "out" and 49 "out" of the corresponding switch members 47 and 49, respectively; that the second contact finger is connected to the conducting strip 48 "out;" that the third contact finger is connected to the conducting strip 45 "out" and 49 "out;" that the fourth contact finger is connected to the conducting strip 46 "out," and that the fifth contact finger is connected to the conducting strips 45 "out" and 47 "out." These notations indicate that, when the several switches are in their operative positions, their corresponding conducting strips, as hereinbefore mentioned, are actuated to interrupt the associated circuits.

To understand the operation of our system, consider that the voltage impressed upon the railway system is substantially normal under the load conditions obtaining. In this instance, no correction or regulation of the voltage is necessary. The switch 37 occupies its upper position, thereby energizing the "on" magnet of the pneumatic control system. The windings of the switch members 45 and 46 are energized by reason of the fact that the controller occupies its "off" position, thereby permitting a circuit to be established between the two upper contact fingers 69 of the lower portion of the drum 50 and the conductor 78 which is connected through the contact finger $69^a$ to the conducting strip 68. The switches 45 and 46 being energized, and the switch 38 being in its open position by reason of the normal voltage upon the railway system, the controller 50 is held in any position in accordance with the sequence of operation, as explained above. The limiting devices 23 and 24 are connected directly across the portion $22^b$ of the secondary winding 22.

Assume that the load upon the railway system is one-third of full-load, and that the voltage impressed thereupon drops to 90% of normal value. Under these conditions, the actuating coil of switch 38 is deënergized and that of the switch 16 is operatively energized, inasmuch as the latter switch is designed to operate at one-third of full load. Since the "on" magnet 61 of the pneumatic control device is energized, and the "off" magnet is likewise energized through the contact strips 65 and 66 of the upper portion of the drum controller 50, the drum 50 will be moved to the position $1^a$. At the same time, the circuit through the winding of the switch 45 is broken, the switch 46 remaining energized, and the circuit through the switch 47 is established by reason of the engagement of the second and third contact fingers 69 of the lower portion of the drum 50 with the conducting strip 68. The portion $22^b$ of the secondary winding 22 is, therefore, connected directly in circuit with the railway system, and the portion $22^c$ thereof is connected in shunt to the current-limiting devices 23 and 24, as mentioned above. If the correction in the voltage thus applied is sufficient, the drum 50 will be held in the position indicated at $1^a$, since the contact finger $67^c$ will be disengaged from the contact strip 65 in this position and the circuit through the operating "off" magnet 60 will be disconnected. As hereinbefore mentioned, the drum 50 will be held in this position since the "off" magnet is deënergized and the "on" magnet of the pneumatic control apparatus is energized.

Assuming that the load upon the railway system increases to two-thirds of full-load and, as a consequence thereof, the voltage drops below 90% of normal, the switch 37 maintains the "on" magnet 61 energized as heretofore. The circuits established through the switches 16 and 17 and the switch 38 are also completed, since the control drum occupies the position $1^a$. As a result, the "off" magnet 60 is energized, and the drum 50 moves to the position $2^a$. In this position, the coils of switches 47 and 48 are energized, and the switches 45 and 46 are deënergized by reason of the disengagement of the contact strip 68 and the two upper contact fingers 69 on the lower portion of the drum 50. When the drum 50 occupies the position $2^a$, the portions $22^b$ and $22^c$ of the secondary winding 22 are connected directly in circuit, and the portion $22^d$ is connected in shunt to the current-limiting devices 23 and 24. If the voltage has been corrected by reason of the connections thus effected, the drum 50 will remain at the position $2^a$.

Assume that the load upon the railway system increases to full-load value, and that, as a result, the voltage impressed thereupon decreases below 90% of normal value. In this instance, the circuits established through the switches 37 and 38 and the switches 16, 17 and 18 are completed. Moreover, the "off" magnet 60 is connected in circuit, since the drum 50 occupies the position $2^a$. As a consequence, the drum is moved to the position $3^a$ which causes the switches 48 and 49 to be energized and the switches 45, 46 and 47 to be deënergized. With the control drum in the position $3^a$, the portions $22^b$, $22^c$ and $22^d$ of the secondary winding 22 are connected directly in circuit with the railway system, and the portion $22^e$ is connected in shunt to the current-limiting devices 23 and 24. In this manner, the maximum voltage correction may be applied.

When the maximum voltage correction has been applied, the drum 50 occupies the position $3^a$. As the load upon the railway system decreases, the voltage impressed thereupon increases because of the voltage correction applied, and if it exceeds 110% of normal value, the switch 38 will operate to open its associated circuits and the switch 37 will be drawn downwardly, thereby disconnecting the circuit through the "on" magnet 61. The "off" magnet 60 having been previously deënergized by reason of the switch 38 being actuated, the pneumatic control apparatus will move the drum 50 backwardly to the position indicated at $2^a$. The switch 49 will consequently be deënergized and the amount of the voltage compensation will be decreased. As the drum 50 moves backwardly to its "off" position, the switch 48 will be deënergized, and, when it occupies the "off" position, the switches 45 and 46 will be again energized. If, at any time during the movement of the drum 50 toward its "off" position, the voltage upon the railway system decreases to a value less than 110% of normal but greater than 90% of normal value, the switch 37 will close the circuit through the "on" magnet 61, thereby holding the drum in a fixed position.

From the foregoing description, it will be noted that voltage corrections are applied only when the voltage impressed upon the railway system is less than a certain per cent. of normal value and greater than a certain per cent. of normal value, such as 90% of normal and 110% of normal, respectively. Again, voltage corrections are applied by reason of cutting in and cutting out selected portions of the secondary booster winding 22 when different loads are required on the railway circuit. The connections for accomplishing the above-indicated results are automatically effected by means of the drum controller 50 which, in turn, is actuated in accordance with the automatic energization of the valve magnets 60 and 61.

If, for any reason whatsoever, the load in the railway circuit drops off, with a predetermined voltage correction impressed thereupon by reason of a portion of the voltage-generating winding 22 being connected in circuit, the control drum 50 will be directly moved to such position as to immediately apply the proper voltage correction for the reduced load. In this manner, it is unnecessary that the control drum 50 be returned to its "off" position and subsequently moved to such position as to effect the proper voltage correction. Again, if the circuit is interrupted by reason of the opening of the line switch 5, the voltage-generating winding 22 will be deënergized, and the circuit through the "on" magnet 61 of the control apparatus will be interrupted because the interlock 5 will open the circuit therethrough as the switch 5 opens the main circuit. When the "on" magnet 61 is deënergized, the control drum 50 will be automatically returned to its "off" position, so that, when normal conditions are again reëstablished in the load circuit, a minimum portion only of the voltage generating winding 22 will be connected in circuit therewith. As a consequence, the system is protected since it is assured that the load circuit will not be reconnected in circuit when any appreciable portion of the voltage-generating winding 22 is likewise connected in circuit which would cause, under certain conditions, an abnormally high voltage to be impressed thereon. By reason of the voltage switches 37 and 38, the control drum 50 is precluded from either connecting in circuit or disconnecting from circuit increased or decreased portions, respectively, of the voltage-generating winding 22 when the voltage obtaining upon the load circuit is greater or less than the established predetermined limits. For instance, it is impossible to effect such a movement of the control drum as to further increase the active length of the voltage-generating winding 22 to be connected in circuit with the load circuit when the voltage impressed upon the load circuit exceeds, for example, 110% of normal value, and likewise, it is impossible for the control drum 50 to be actuated to further decrease the active length of the voltage-generating winding to be connected in circuit with the load circuit when the voltage obtaining thereon is less than 90% normal value.

If a failure of any kind should cause all of switches 45, 46, 47, 48 and 49 to simultaneously open, an excess current will be forced to flow through the choke coil 26 and the operating coil 27 of the relay 28. The relay 28 completes a circuit by means of the bridging member 28ᵃ, through the trip coil 9 of the circuit breaker 7. The operation of the circuit breaker 7 deënergizes the operating coil 6 of the main switch 5, thus causing the main switch 5 to open and break the main circuit rather than one of the voltage-correction switches 45, 46, 47, 48 and 49. This feature permits of the use of low-voltage switches for effecting the voltage correcting operations, such as the switches 45 to 49, thus requiring only one high-voltage switch 5 of a capacity suitable for opening the main circuit at line voltage.

While we have herein shown and described, in detail, one embodiment of our invention, and have designated the several switches as adapted to operate at certain voltages and certain loads, it will be understood that the control devices may be so regulated and modified as to operate at other voltages and other loads in order to compensate, to a greater or less degree, for the variations in the voltages impressed upon the railway system. The circuit connections and the arrangement of the apparatus may, of course, be varied within the spirit and scope of our invention, and we desire that only such limitations shall be imposed as are indicated in the appended claims.

We claim as our invention:

1. A system of electrical distribution comprising an alternating-current supply circuit, a variable-load circuit, and means interposed between said two circuits for automatically regulating the voltage impressed upon said load circuit in accordance with the loads obtaining therein, said means being operative only when the voltage variations in the load circuit are greater or less than predetermined values.

2. A system of electrical distribution comprising an alternating-current supply circuit, a variable-load circuit, a voltage-generating winding connected in series circuit with the load circuit, and automatic means for varying the active portions of said winding to be connected in series with the load circuit in accordance with the loads obtaining therein, said means being operative only when the voltage impressed upon said load circuit is greater or less than predetermined values.

3. A system of electrical distribution comprising an alternating-current supply circuit, a variable-load circuit, a transformer having its primary winding excited from said supply circuit and its secondary winding adapted to be connected in series with said load circuit, and automatic means for varying the active length of said secondary winding in accordance with the load obtaining in the load circuit, said means being operative only when the voltage impressed upon the said load circuit varies beyond certain predetermined limits.

4. A system of electrical distribution comprising an alternating-current supply circuit, a variable-load circuit subject to voltage fluctuations, and automatic means dependent upon the voltage fluctuations in said load circuit that exceed predetermined limits for regulating the voltage impressed upon the load circuit in accordance with the loads obtaining thereon.

5. A system of electrical distribution comprising an alternating-current supply circuit, a variable-load circuit subject to voltage fluctuations, a voltage-generating winding adapted to be connected in series circuit with the load circuit, relays operative when the voltage is either greater or less than predetermined values for automatically controlling auxiliary circuits, and other relays inserted in said auxiliary circuits and operative in accordance with the loads obtaining in said load circuit for varying the active lengths of said voltage-generating winding.

6. A system of distribution comprising an alternating-current supply circuit, a variable-load circuit, a voltage-generating winding adapted to be connected in series circuit with the load circuit, and automatic means for varying the active portions of said winding to be connected in series with the load circuit in accordance with the loads obtaining therein, said means being directly responsive to variations in the voltage that exceed predetermined limits for immediately varying the active portion of said winding to be connected in circuit in order to reestablish normal voltage conditions thereon.

7. A system of distribution comprising an alternating-current supply circuit, a variable-load circuit, a voltage-generating winding adapted to be connected in series circuit with the load circuit, automatic means for varying the active portions of said winding to be connected in series with the load circuit in accordance with the loads obtaining therein, and an automatic switch for deënergizing said voltage-generating winding when abnormal conditions obtain on the load circuit and for affecting the said automatic means whereby the minimum active length of the voltage-generating winding may be initially connected in the load circuit when normal conditions are reëstablished thereon.

8. A system of distribution comprising an alternating-current supply circuit, a variable-load circuit, a voltage-generating winding adapted to be connected in series circuit with the load circuit, automatic means for varying the active portions of said winding to be connected in series with the load circuit in accordance with the loads obtaining therein, and additional means associated with said automatic means for precluding any increase or decrease in the length of the active portion of the voltage-generating winding connected in circuit with the load circuit when the voltage obtaining in the load circuit is greater or less than predetermined values, respectively.

In testimony whereof, we have hereunto subscribed our names this 25th day of Jan., 1916.

KARL A. SIMMON.
PAUL L. MARDIS.